(12) United States Patent
McGuire (10) Patent No.: US 8,690,541 B2
(45) Date of Patent: Apr. 8, 2014

(54) TURBINE AND A ROTOR FOR A TURBINE (75) Inventor: Bernard McGuire, Boyle (IE)

(73) Assignee: Bri Toinne Teoranta, Boyle (IE)

( * ) Notice: Subject to any disclaimer, the term of this patent is extended or adjusted under 35 U.S.C. 154(b) by 558 days.

(21) Appl. No.: 13/059,385

(22) PCT Filed: Aug. 21, 2009

(86) PCT No.: PCT/IE2009/000058
§ 371 (c)(1),
(2), (4) Date: May 5, 2011

(87) PCT Pub. No.: WO2010/023648
PCT Pub. Date: Mar. 4, 2010

(65) Prior Publication Data
US 2011/0200437 A1    Aug. 18, 2011

(30) Foreign Application Priority Data
Aug. 27, 2008   (IE) .................................. S2008/0691

(51) Int. Cl.
F03B 3/12        (2006.01)

(52) U.S. Cl.
USPC ................... 416/176; 416/227 A; 416/227 R; 415/72

(58) Field of Classification Search
USPC ....... 415/72; 416/176, 227 R, 227 A; 290/43, 290/44, 54, 55
See application file for complete search history.

(56) References Cited

U.S. PATENT DOCUMENTS 1,740,596 A * 12/1929 Hohlt ............................ 416/184
2,020,900 A * 11/1935 Methvin ................... 416/227 R
(Continued)

FOREIGN PATENT DOCUMENTS

| KR | 10-2006-0014267 | 2/2006 |
|---|---|---|
| WO | 03/021105 A1 | 3/2003 |

OTHER PUBLICATIONS

International Search Report for PCT/IE2009/000058 dated Jun. 23 2010.

*Primary Examiner* — Ninh H Nguyen
(74) *Attorney, Agent, or Firm* — Sughrue Mion, PLLC (57) ABSTRACT

A water powered turbine (1) comprises a main support framework (2) which rotatably carries a rotor (3) comprising a main shaft (5) to which three blades (7) are attached by carrier discs (8) and (9). The carrier discs (8, 9) are rigidly secured to the main shaft (5), and the blades (7) are pivotally connected to the discs (8) and (9) by pivot shafts (16) and (17). Each blade (7) is of constant hydro-foil cross-section along its entire length and defines a first upper spiral (12) and a second lower spiral (13). The first spiral (12) extends from a first end (10) which is coupled to the main shaft (5) by the carrier disc (8), and the second spiral (13) of each blade (7) extends from a second end (11) of the blade (7) which is coupled to the main shaft (5) by the carrier disc (9). The first and second spirals (12) and (13) are of opposite hand and extend from the respective first and second ends (10, 11) to meet midway between the respective first and second ends (10, 11). The first and second spirals (12, 13) define respective central spiral axes which substantially coincide with a main central rotational axis (4) about which the rotor (3) is rotatable. The pivot shafts (16, 17) of each blade (7) define a corresponding secondary axis (18) about which the blades (7) are pivotal for selectively altering the dive angle of the first and second spirals (12) and (13) of the blades (7).

20 Claims, 6 Drawing Sheets

(56) References Cited

U.S. PATENT DOCUMENTS

| | | | |
|---|---|---|---|
| 4,012,163 A * | 3/1977 | Baumgartner et al. | 415/208.3 |
| 5,405,246 A | 4/1995 | Goldberg | |
| 5,642,984 A | 7/1997 | Gorlov | |
| 2008/0075599 A1 * | 3/2008 | Miller | 416/182 |

* cited by examiner

TURBINE AND A ROTOR FOR A TURBINE

The present invention relates to a turbine, and in particular, a water powered or a wind powered turbine, although, needless to say, the turbine may be powered by any suitable flowing fluid medium. The invention also relates to a rotor for the turbine.

Turbines for converting a flowing fluid medium, for example, air or water to rotational energy are well known. Such turbines, in general, comprise a rotor having a rotatably mounted shaft which is rotatable about a main central axis and a plurality of turbine blades coupled to the shaft. The blades are configured relative to the shaft, so that the flowing fluid on engaging the turbine blades causes the turbine blades to move, which in turn rotates the rotor and the shaft of the rotor to produce rotational energy. An electrical generator or other suitable energy converter may be coupled to the shaft of the rotor to be driven thereby. Depending on the configuration of the turbine blades relative to the main central axis of the rotor, the turbine may be an axial flow turbine, a radial flow turbine, or an axial and radial flow turbine. In an axial flow turbine the flowing fluid medium flows through the turbine in an axial direction relative to the main central axis of the rotor. In a radial flow turbine the flowing fluid flows through the turbine in a radial direction relative to the main central axis of the rotor, while in an axial and radial flow turbine the flowing fluid, in general, enters the turbine in an axial direction and exits the turbine in a radial direction.

Radial flow turbines are particularly suitable for converting wind energy to rotational energy, since they are non-directional, in other words, their operation is unaffected by the direction from which the wind is blowing. However, such radial flow turbines tend to suffer from various disadvantages. For example, in general they are not self starting, and can be difficult to start, and where such turbines are not self starting, they require quite an amount of energy to run them up to a speed whereby they can then continue rotating under the action of wind or water. Additionally, such radial flow turbine tend to be relatively inefficient.

There is therefore a need for a turbine which addresses at least some of the problems of prior art turbine.

The present invention is directed towards providing such a turbine, and the invention is also directed towards providing a rotor for a turbine.

According to the invention there is provided a turbine comprising a rotor defining a main central rotational axis about which the rotor is rotatable, the rotor comprising at least one elongated ribbon type blade extending between a first end and a second end and being of transverse cross-section along substantially its entire length of one of an airfoil and a hydrofoil cross-section, the at least one blade defining at least a first spiral extending from the first end thereof, and extending from a first location adjacent the main central rotational axis with the first end of the blade adjacent the first location and a first central spiral axis defined by the first spiral substantially coinciding with the main central rotational axis.

In one embodiment of the invention the first spiral of the at least one blade extends to a maximum spiral diameter.

Preferably, the at least one blade defines a second spiral extending from the second end of the blade, the second spiral defining a second central spiral axis substantially coinciding with the main central rotational axis, the second end of the at least one blade being located adjacent a second location adjacent the main central rotational axis spaced apart along the main central rotational axis from the first location.

Advantageously, the first and second spirals of the at least one blade meet along the blade intermediate the first and second ends thereof.

Advantageously, the maximum diameter of the second spiral is similar to the maximum diameter of the first spiral, and ideally, the first and second spirals of the at least one blade meet along the blade substantially midway between the first and second ends thereof.

In another embodiment of the invention the first and second spirals of the at least one blade are of opposite hand when viewed axially in opposite directions from the respective first and second ends of the blade.

In one embodiment of the invention the first spiral of the at least one blade extends around the main central rotational axis an angular distance of up to 120°. Preferably, the first spiral of the at least one blade extends around the main central rotational axis an angular distance in the range of 50° to 70°. Advantageously, the first spiral of the at least one blade extends around the main central rotational axis an angular distance of approximately 60°.

In one embodiment of the invention the second spiral of the at least one blade extends around the main central rotational axis an angular distance of up to 120°. Preferably, the second spiral of the at least one blade extends around the main central rotational axis an angular distance in the range of 50° to 70°. Advantageously, the second spiral of the at least one blade extends around the main central rotational axis an angular distance of approximately 60°.

Preferably, the at least one blade is of substantially constant transverse cross-section along substantially its entire length.

In one embodiment of the invention the rotor comprises at least two elongated ribbon type blades, the first end of each blade being located adjacent the first location adjacent the main central rotational axis. Preferably, the rotor comprises three elongated ribbon type blades, the first end of each blade being located adjacent the first location adjacent the main central rotational axis, and advantageously, the blades are similar to each other, and ideally, the blades are equi-spaced apart circumferentially around the main central rotational axis.

In one embodiment of the invention the rotor comprises an elongated main shaft, and the first spiral of each blade extends from the first location adjacent the main shaft, and preferably, the second spiral of each blade extends from the second location adjacent the main shaft.

In one embodiment of the invention each blade is pivotally coupled adjacent the first location relative to the main central rotational axis for facilitating selective altering of the dive angle of the blade. Preferably, each blade is pivotally coupled relative to the main central rotational axis adjacent the second location. Advantageously, each blade is pivotally coupled relative to the main central rotational axis about a corresponding secondary axis for facilitating altering of the dive angle of the blade, the secondary axis of each blade extending substantially parallel to the main central rotational axis.

In one embodiment of the invention the turbine is adapted to be water powered.

The invention also provides a rotor for a turbine according to the invention.

Additionally, the invention provides a rotor for a turbine, the rotor defining a main central rotational axis about which the rotor is rotatable, the rotor comprising at least one elongated ribbon type blade extending between a first end and a second end and being of transverse cross-section along substantially its entire length of one of an airfoil and a hydrofoil cross-section, the at least one blade defining at least a first spiral extending from the first end thereof, and extending from a first location adjacent the main central rotational axis with the first end of the blade adjacent the first location and a first central spiral axis defined by the first spiral substantially coinciding with the main central rotational axis.

In one embodiment of the invention the rotor is adapted for use in a water powered turbine.

The advantages of the invention are many. A particularly important advantage of the invention is that it provides a turbine which is particularly efficient and can operate irrespective of the direction from which the flowing fluid which powers the turbine approaches the turbine. Additionally, the turbine according to the invention, in general, is self-starting. It is believed that in embodiments of the invention in which the rotor is provided with a single blade, whether the single blade is configured as a single spiral, or as a first and second spiral, the rotor will be self-starting once the single blade extends around the main central rotational axis defined by the rotor an angular distance of approximately 360°. It is also believed that where the rotor is provided with two blades equi-spaced apart circumferentially around the main central axis of the rotor, irrespective of whether each blade is configured as a single spiral or as a first and second spiral, the turbine should be self-starting. Similarly, where the rotor is provided with three or more blades equi-spaced apart, whether each blade is configured as a single spiral or configured to include respective first and second spirals, it is believed that the turbine should be self-starting.

In particular, in an embodiment of the invention where the rotor is provided with three blades, equi-spaced apart circumferentially around the main central axis of the rotor, and where each blade is configured in the form of a first spiral and a second spiral, and the first spiral and the second spiral of each blade each extends an angular distance around the main central axis of the rotor of approximately 60°, and the first and second spirals of each blade are of opposite hand, it has been found that the sum of the forces acting on the blades by the flowing medium for all angular positions of the rotor results in a rotational force in a predefined rotational direction being applied to the rotor for either initiating rotation of the rotor in the predefined rotational direction or maintaining rotation of the rotor in the predefined rotational direction. Accordingly, in this embodiment of the invention the turbine is self-starting.

Additionally, by providing the blades in the form of first and second spirals which are of opposite hand and extend from respective opposite ends of the blade a particularly efficient construction of turbine is provided.

It is believed that by configuring each blade to be in the form of first and second opposite handed spiral, the pressure gradient induced by the combination of the spirals along each blade from the respective first and second ends of the blade towards the midpoint thereof has a potentiating effect which enhances the efficiency of the operation of the turbine. It is believed that this potentiating effect is enhanced by the hydrodynamic profile or the aerodynamic profile, as the case may be, of each blade.

A further advantage of the turbine according to the invention, particularly where it is adapted for use as a water turbine, is that it is ecologically friendly. Additionally, where the turbine is adapted for use as a water turbine, only the blades need be immersed beneath the surface of the water. A generator, or any other load which the turbine is adapted to drive may be located above the water level. Because of the shape of the blades of the rotor, the energy distribution along the blades at any given part of a 360° rotational cycle of the rotor, is such as to avoid any danger of excessive destructive forces being induced in the blades.

The invention will be more clearly understood from the following description of some preferred embodiments thereof, which are given by way of example only, with reference to the accompanying drawings, in which.

Referring to the drawings and initially to FIGS. 1 to 5, there is illustrated a turbine according to the invention, indicated generally by the reference numeral 1, which in this embodiment of the invention is a water powered turbine. The turbine 1 comprises a main support framework 2 within which a rotor 3 also according to the invention is rotatably mounted about a main central rotational axis 4. The rotor 3 comprises an elongated main shaft 5 which defines the main central rotational axis 4 and is rotatably carried in bearings 6. Three similar elongated ribbon type blades 7 are coupled to the main shaft 5 by a pair of axially spaced apart carrier discs 8 and 9, and are equi-spaced apart circumferentially around the main shaft 5 for translating radial flow of water through the rotor 3 into rotational energy by rotating the main shaft 5 in the main support framework 2. Each blade 7 of the rotor 3 extends between a first end 10 and a second end 11, and is coupled to the carrier discs 8 and 9 adjacent the first and second ends 10 and 11, as will be described below.

Each blade 7 defines a first upper spiral 12 and a second lower spiral 13. The first spiral 12 of each blade 7 extends from the first end 10 of the blade 7, and the second spiral 13 of each blade 7 extends from the second end 11 of the blade 7. The first and second spirals 12 and 13 of each blade 7 are of opposite hand when viewed in opposite axial directions from their respective opposite first and second ends 10 and 11 towards their respective ends of maximum diameter. In other words, the second spiral 13 of each blade 7 is a mirror image of the first spiral 12 of the blade 7. The first spirals 12 of the respective blades 7 are of the same hand as each other, while the second spirals 13 of the respective blades 7 are also of the same hand as each other. The first and second spirals 12 and 13 of each blade 7 are of similar maximum diameter, and thus, the first and second spirals 12 and 13 of each blade 7 meet along the blade 7 approximately midway between the first and second ends 10 and 11 thereof. The first spiral 12 of each blade 7 extend around the main central rotational axis 4 for an angular distance of approximately 60°, and the second spiral 13 of each blade 7 also extends around the main central rotational axis 4 an angular distance of approximately 60°.

The carrier discs 8 and 9 are rigidly secured to the main shaft 5 at respective axially spaced apart first and second locations 14 and 15. The first and second ends 10 and 11 of the blades 7 are pivotally coupled to the respective carrier discs 8 and 9 by to pivot shafts 16 and 17, respectively. The pivot shafts 16 and 17 of each blade 7 define a corresponding secondary axis 18 about which the blade 7 is pivotal for advancing or retarding the blade 7 to increase or decrease the dive angle of the first and second spirals 12 and 13 of the blade 7. A suitable mechanism (not shown) is located on at least one of the carrier discs 8 and 9 for pivoting the blades 7 about the respective secondary axes 18 to selectively alter the dive angle of the blades 7 and to retain the blades 7 at the desired dive angle. The mechanism (not shown) for altering the dive angle of the blades 7 may be manually operable or may be powered by, for example, a servo-motor (also not shown). The blades 7 are coupled to the carrier discs 8 and 9 by the pivot shafts 16 and 17 so that the first and second central spiral axes of the first and second spirals 12 and 13 of each blade 7 coincide substantially with the main central rotational axis 4 of the main shaft 5 for all reasonable dive angles of the first and second spirals 12 and 13 of the blades 7.

Figure 4:
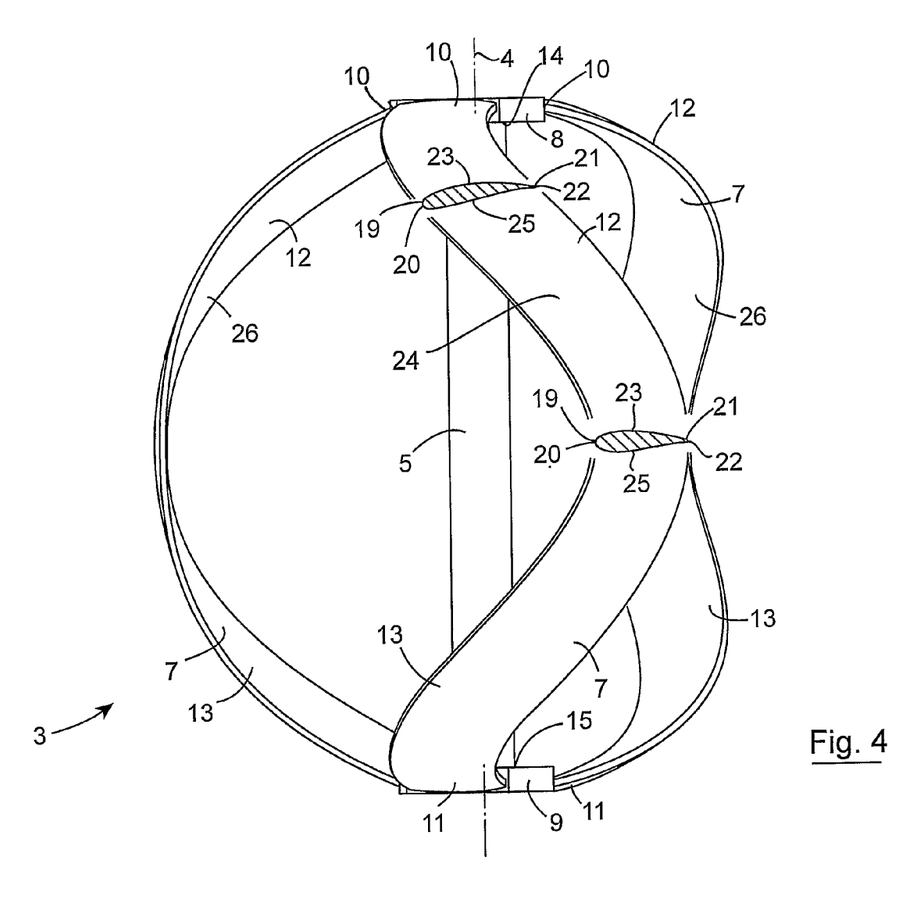
FIG. 4 is a front elevational view of the rotor of FIG. 2 of the turbine of FIG. 1 illustrating portions of the rotor in cross-section.
Figure 5:
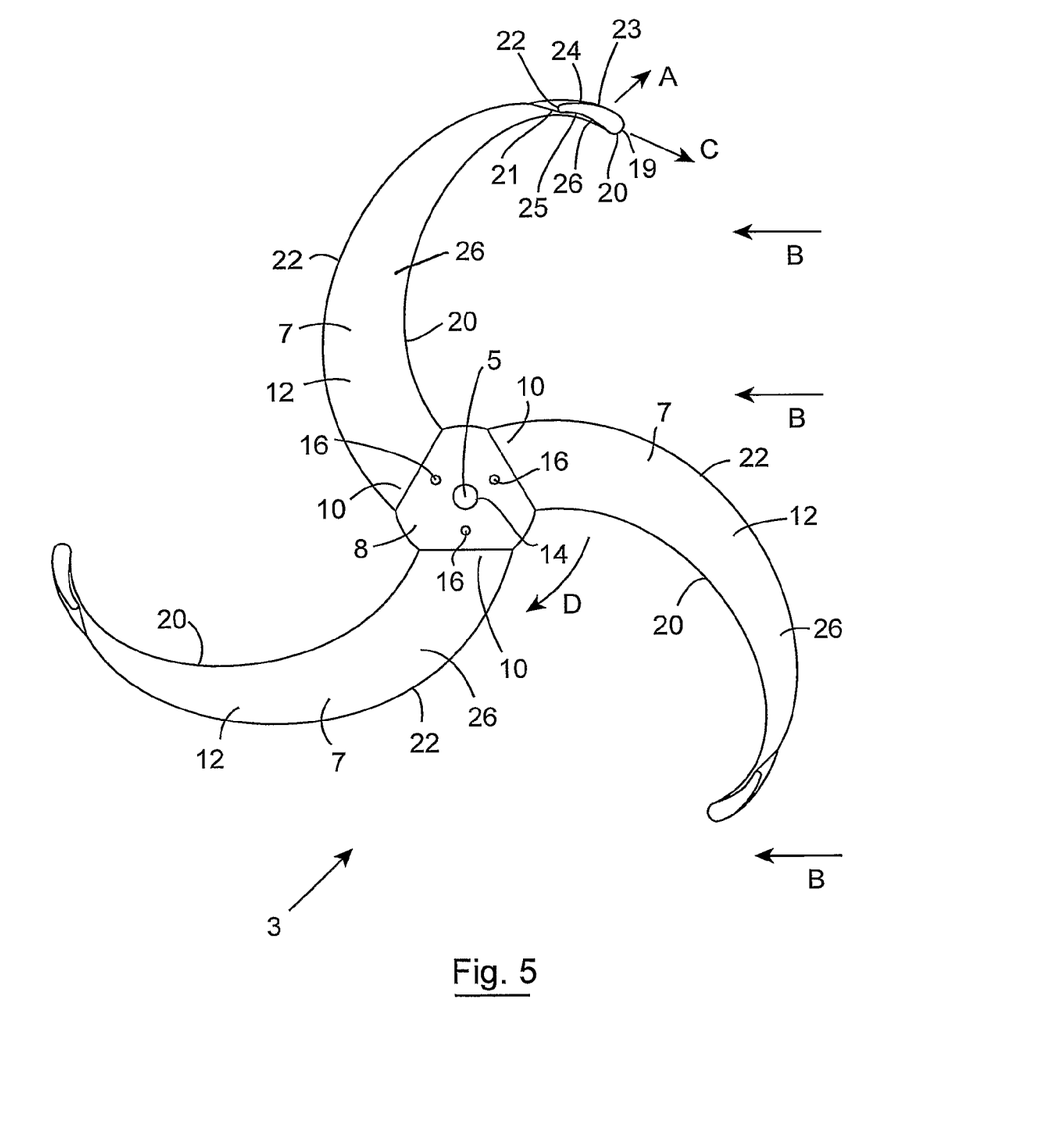
FIG. 5 is an underneath transverse cross-sectional plan view of the rotor of FIG. 2 on the line V-V of FIG. 2 of the turbine of FIG. 1.

Referring now in particular to FIGS. 4 and 5, each blade 7 is of constant hydrofoil transverse cross-section over substantially its entire length. The hydrofoil cross-section of each blade 7 comprises a leading point 19 which forms the leading edge 20 of the blade 7, and a trailing point 21 which forms the trailing edge 22 of the blade 7. An outer line 23 extending from the leading point 19 to the trailing point 21 of each hydrofoil cross-section defines an outer surface 24 of the blade 7. An inner line 25 extending from the leading point 19 to the trailing point 21 of each hydrofoil cross-section defines an inner surface 26 of the blade 7. The length of the outer line 23 from the leading point 19 to the trailing point 21 of each blade 7 is greater than the length of the inner line 25 from the leading point 19 to the trailing point 21 in order to give lift in the direction of the arrow A as water flows past the blade 7 in the direction of the arrows B.

Figure 1:
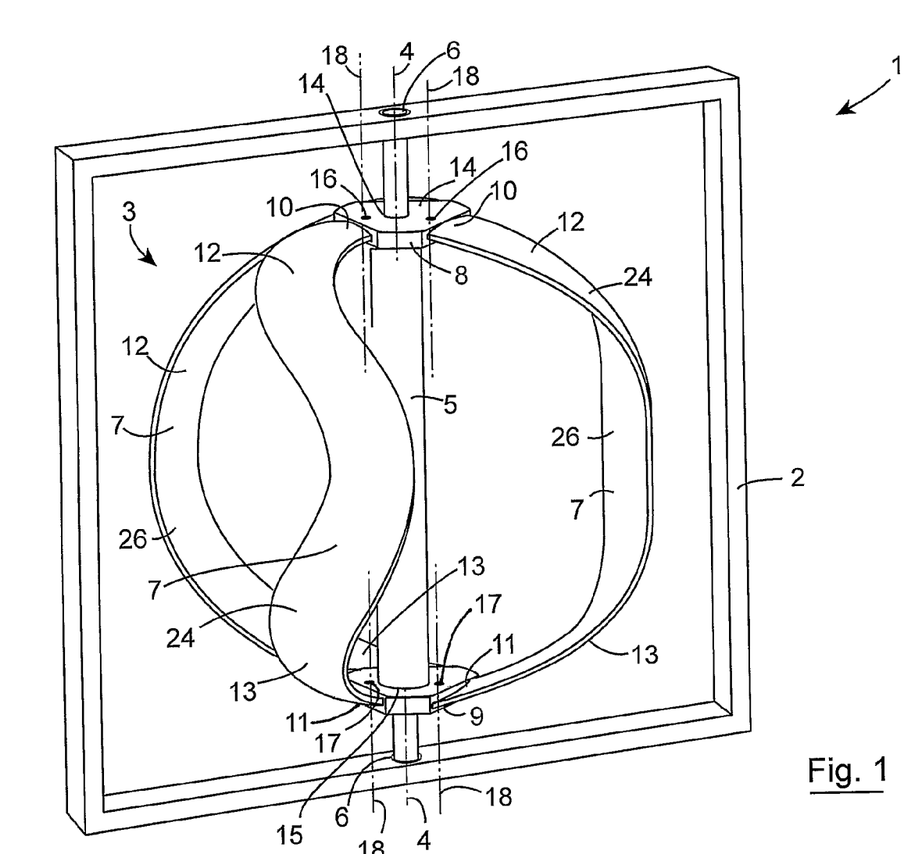
FIG. 1 is a perspective view of a turbine according to the invention.
Figure 2:
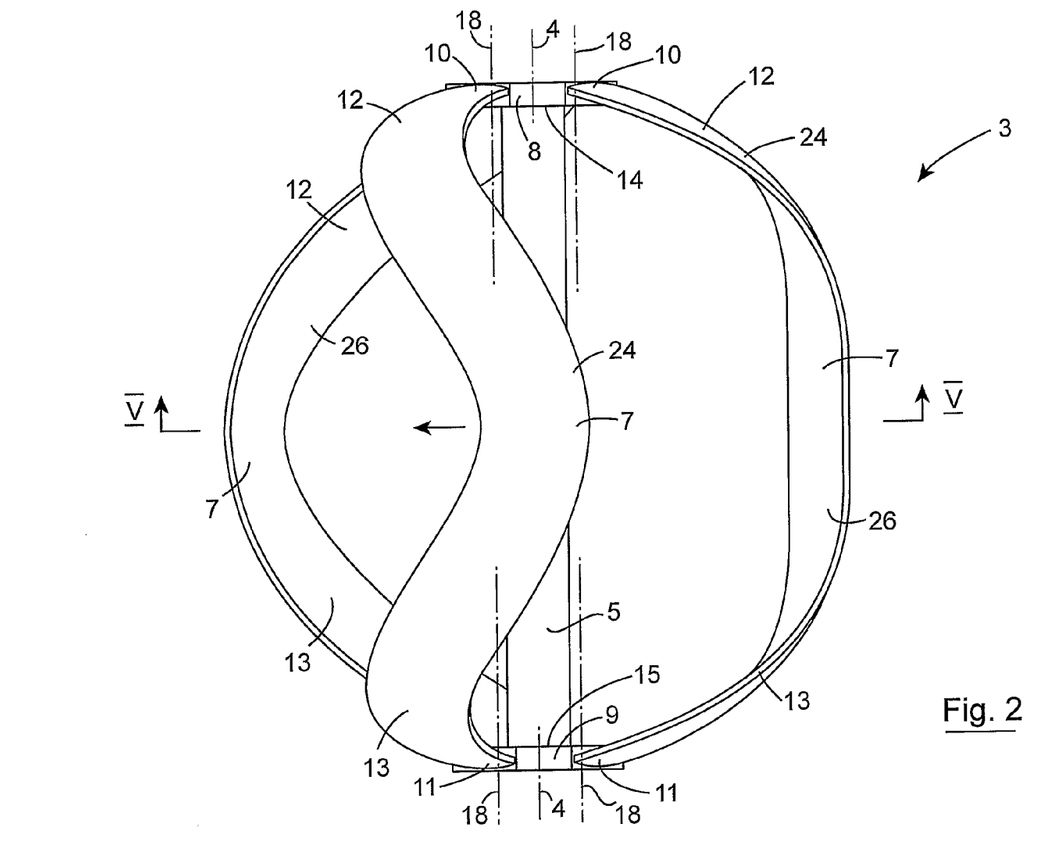
FIG. 2 is a front elevational view of a rotor also according to the invention of the turbine of FIG. 1.
Figure 3:
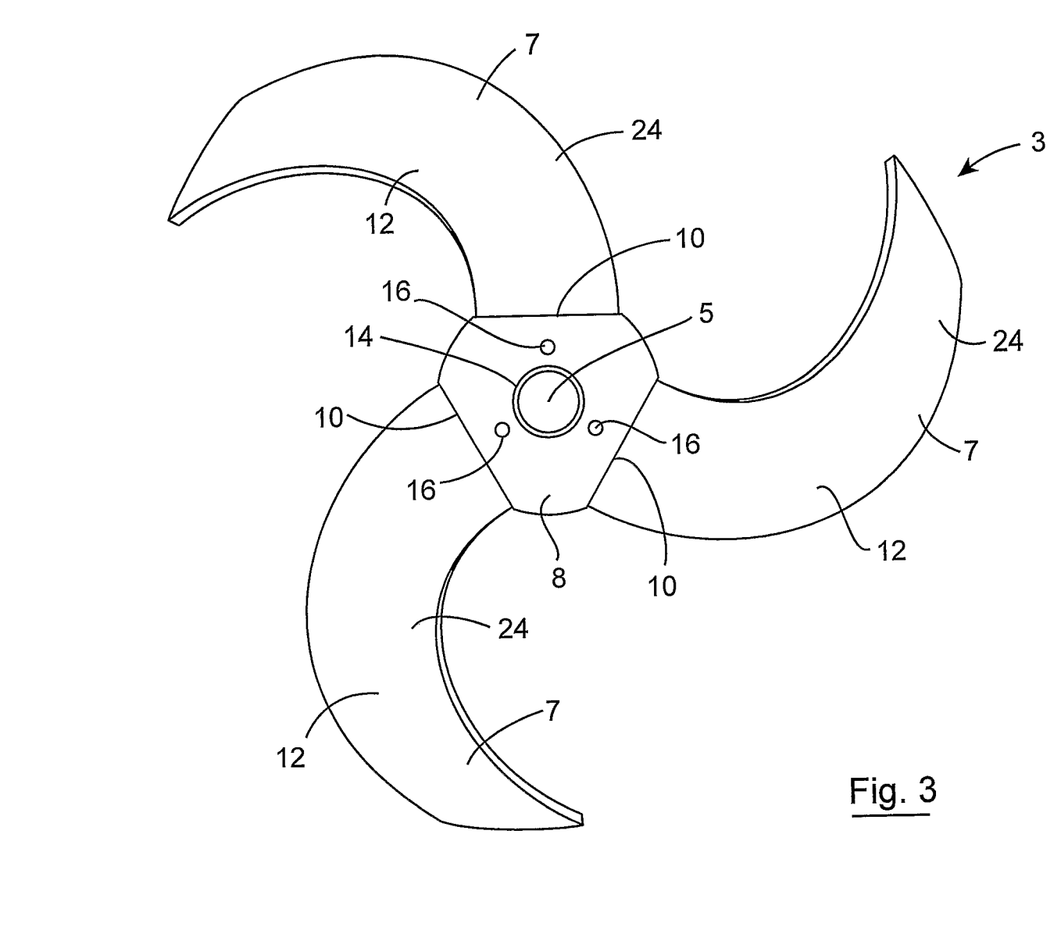
FIG. 3 is a top plan view of the rotor of FIG. 2 of the turbine of FIG. 1.

In this embodiment of the invention the blades 7 of the rotor 3 define a sphere.

In use, in practice the turbine 1 will have a suitable housing within which the main shaft 5 will be rotatably mounted. The turbine 1 has been illustrated with the rotor 3 rotatably mounted in the framework 2 solely for ease of illustration and description of the turbine 1. The turbine 1 is located in a flow of water, for example, in a river, in a tidal flow in the sea or in any suitable location, and ideally is located with its main central rotational axis 4 extending vertically, although it will be readily apparent to those skilled in the art that the turbine 1 may be located with the main central rotational axis 4 extending horizontally, or at any suitable or desired angle between the vertical and the horizontal.

Flow of water past the blades 7 in the direction of the arrows B acting on the hydrofoil cross-section of the blades 7 causes the blades 7 to move in the direction of the arrow C, thereby rotating the rotor 3 and in turn the main shaft 5 in the direction of the arrow D, see FIG. 5. As the water continues to flow past the blades 7, the forward motion of the blades 7 in the direction of the arrow C continues to rotate the rotor 3 and in turn the main shaft 5 in the direction of the arrow D, which may be used to power an electrical generator directly or through a gearbox or drive transmission, or to drive any other prime mover.

When it is desired to alter the dive angle of the first and second spirals 12 and 13 of the blades 7, the blades 7 are pivoted about their respective secondary axes 18 defined by the pivot shafts 16 and 17. The dive angle of the first and second spirals 12 and 13 is increased by advancing the blades 7 by pivoting the blades 7 about the respective secondary axes 18 defined by the pivot shafts 16 and 17 in the direction of rotation D of the main shaft 5, and the dive angle of the first and second spirals 12 and 13 of the blades 7 is decreased by retarding the blades 7 by pivoting the blades 7 about the secondary axes 18 defined by the pivot shafts 16 and 17 in the opposite direction to the direction of rotation of the main shaft 5, namely, in the direction opposite to that of the arrow D. In relatively slow moving waters, it is envisaged that the dive angle of the first and second spirals 12 and 13 of the blades 7 will be increased, and decreased as the speed of flow of the water increases.

However, the maximum angular shift from maximum to minimum dive angle of the first and second spirals 12 and 13 of the blades 7 will be dependent on the spacing between the secondary axes 18 of the respective blades from the main central rotational axis 4 of the main shaft 5. The closer the respective secondary axes 18 are to the main central rotational axis 4, the lesser will be the range of dive angles between the maximum and minimum dive angles. In other words, the dive angle through which each blade can be shifted from the maximum dive angle to the minimum dive angle will reduce as the spacing between the respective secondary axes 18 and the main central rotational axis 4 is reduced.

Figure 6:
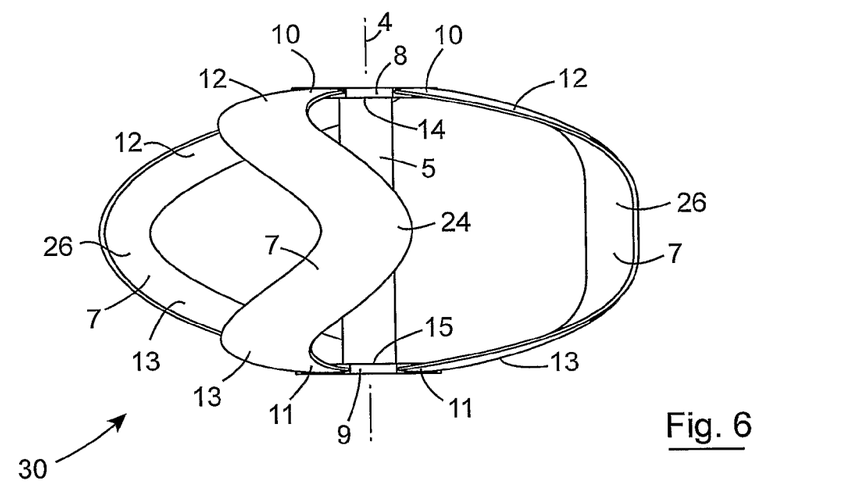
FIG. 6 is a front elevational view of a rotor according to another embodiment of the invention of a turbine also according to another embodiment of the invention.
Figure 7:
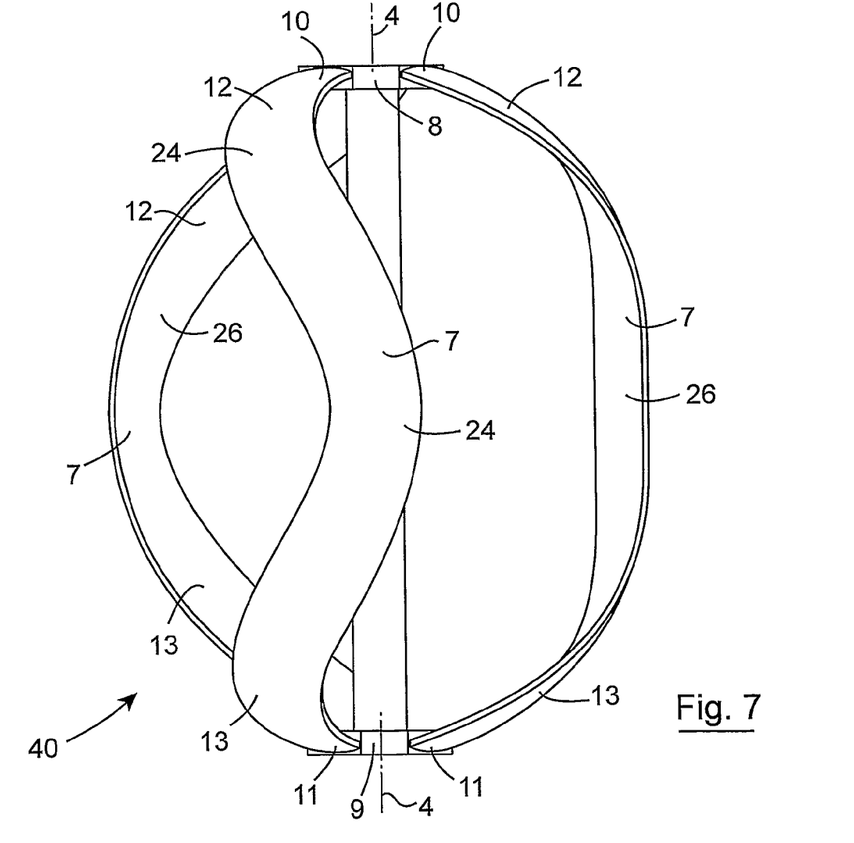
FIG. 7 is a front elevational view of a rotor according to a further embodiment of the invention of a turbine also according to a further embodiment of the invention.

Referring now to FIGS. 6 and 7, there are illustrated two rotors according to other embodiments of the invention indicated generally by the reference numerals 30 and 40, respectively, for turbines (not shown) also according to other embodiments of the invention. The rotor 30 of FIG. 6 is substantially similar to the rotors 3 of the turbine 1 described with reference to FIGS. 1 to 5, and similar components are identified by the same reference numerals. The only difference between the rotor 30 of FIG. 6 and the rotor 3 of the turbine 1 of FIGS. 1 to 5 is that the blades 7 of the rotor 30, instead of defining a sphere, define an ovoid having its major plane extending transversely of the main central rotational axis 4. The only difference between the rotor 40 of FIG. 7 and the rotor 3 of the turbine 1 described with reference to FIGS. 1 to 5 is that the blades 7 of the rotor 40, instead of defining a sphere, define an ovoid, the major plane of which contains the main central rotational axis 4.

The advantage of providing the turbine with the rotor 30 of FIG. 6 is that the turbine is particularly suitable for use in shallow waters where the turbine is to be operated with the main central rotational axis 4 extending vertically. For example, the turbine of FIG. 6 is particularly suitable for use in shallow water and enables a greater swept volume in such shallow water, as for example, in a tidal estuary. The advantage of the turbine with the rotor 40 of FIG. 7 is that the turbine is particularly suitable for use in shallow waters where the rotor is to be configured with the main central rotational axis 4 thereof horizontal. For example, the turbine of FIG. 7 would be particularly suitable for use as a wave powered turbine with the rotor 40 disposed to operate with the main central rotational axis extending horizontally.

While the turbines according to the invention have been described as being water to powered turbines, the turbines may be provided as wind powered turbines, in which case the blades 7 of the turbines would be of airfoil transverse cross-section instead of hydrofoil transverse cross-section.

While the turbines according to the invention have been described as comprising three blades, in certain cases, it is envisaged that the turbines may comprise only one blade, and in other cases it is envisaged that the turbines may comprise any suitable number of blades from two upwards.

Further, it will be appreciated that while each of the first and second spirals of each blade has been described as extending around the main central rotational axis an angular distance of approximately 60°, the first and second spirals of the blades may extend around the main central rotational axis an angular distance greater than or less than 60°, and indeed in theory could extend an angular distance greater than 360° around the main central rotational axis.

It will also be appreciated that while the first and second spirals forming each blade have been described as being mirror images of each other, while this is preferable, it is not essential.

It will also be appreciated that in certain cases each blade may be provided in the form of a first spiral only, or may be provided in the form of a second spiral only, in which case, each blade would terminate in a free end at the maximum radius from the main central rotational axis defined by the spiral.

While it is desirable that the blades 7 should be pivotally coupled to the main shaft 5 for facilitating altering the dive angle of the first and second spirals 12 and 13, this is not essential, and in certain cases, the blades 7 may be rigidly coupled to the main shaft.

While the blades have been described as being of constant transverse cross-section over substantially their entire length, it is envisaged that in certain cases, the transverse cross-section of the blades may vary over their length, for example, the transverse cross-section of the blades adjacent the first and second ends may be less than the transverse cross-section of the blades adjacent a location midway between the first and second ends of the blades. In which case, it is envisaged that the distance between the leading and trailing edges of the blades would be greater adjacent the midsection of the blades than adjacent the first and second ends thereof, and it is envisaged that the distance between the leading and trailing edge of each blade may progressively decrease from the respective first and second ends of the blade towards a central portion of the blade midway between the first and second ends. In other words, the width of each blade from its leading edge to its trailing edge would be wider at the first and second ends thereof than midway between the first and second ends of the blade, and the width of each blade from the leading edge to the trailing edge would increase, and in general, would progressively increase from the midpoint of each blade to the respective first and second ends thereof.

The invention claimed is:

1. A turbine comprising:
a rotor defining a main central rotational axis about which the rotor is rotatable, the rotor comprising:
at least one elongated ribbon type blade extending between a first end and a second end and being of transverse cross-section along substantially its entire length of one of an airfoil and a hydrofoil cross-section, the first end of the at least one blade being located at a first location adjacent the main central rotational axis, and the second end of the at least one blade being located at a second location adjacent the main central rotational axis, the second location being axially spaced apart from the first location, the at least one blade defining a first spiral and a second spiral, the first spiral defining a first spiral axis, and the second spiral defining a second spiral axis, the first spiral extending from the first end of the blade and the second spiral extending from the second end of the blade to meet the first spiral intermediate the first and second ends of the blade with the first and second spiral axes substantially coinciding with the main central rotational axis, the first and second spirals of the at least one blade being of opposite hand when viewed axially in opposite directions from the respective first and second ends of the blade.

2. A turbine as claimed in claim 1 in which the first spiral of the at least one blade extends to a maximum spiral diameter, and the maximum diameter of the second spiral is similar to the maximum diameter of the first spiral.

3. A turbine as claimed in claim 1 in which the first and second spirals of the at least one blade meet along the blade substantially midway between the first and second ends thereof.

4. A turbine as claimed in claim 1 in which the second spiral of the at least one blade extends around the main central rotational axis an angular distance of up to 120°.

5. A turbine as claimed in claim 1 in which the first spiral of the at least one blade extends around the main central rotational axis an angular distance of up to 120°.

6. A turbine as claimed in claim 1 in which the at least one blade is of substantially constant transverse cross-section along substantially its entire length.

7. A turbine as claimed in claim 1 in which the rotor comprises at least two elongated ribbon type blades, the first end of each blade being located adjacent the first location adjacent the main central rotational axis, and the second end of each blade being located adjacent the second location adjacent the main central rotational axis.

8. A turbine as claimed in claim 7 in which the blades are similar to each other, and are equi-spaced apart circumferentially around the main central rotational axis.

9. A turbine as claimed in claim 1 in which the rotor comprises an elongated main shaft and the first spiral of each blade extends from the first location adjacent the main shaft, and the second spiral of each blade extends from the second location adjacent the main shaft.

10. A turbine as claimed in claim 1 in which each blade is pivotally coupled adjacent the first location and the second location relative to the main central rotational axis for facilitating selective altering of the dive angle of the blade.

11. A turbine as claimed in claim 10 in which each blade is pivotally coupled relative to the main central rotational axis about a corresponding secondary axis for facilitating altering of the dive angle of the blade, the secondary axis of each blade extending substantially parallel to the main central rotational axis.

12. A turbine as claimed in claim 1 in which the turbine is adapted to be water powered.

13. A rotor for a turbine, the rotor defining a main central rotational axis about which the rotor is rotatable, the rotor comprising:
at least one elongated ribbon type blade extending between a first end and a second end and being of transverse cross-section along substantially its entire length of one of an airfoil and a hydrofoil cross-section, the first end of the at least one blade being located at a first location adjacent the main central rotational axis, and the second end of the at least one blade being located at a second location adjacent the main central rotational axis, the second location being axially spaced apart from the first location, the at least one blade defining a first spiral and a second spiral, the first spiral defining a first spiral axis, and the second spiral defining a second spiral axis, the first spiral extending from the first end of the blade and the second spiral extending from the second end of the blade to meet the first spiral intermediate the first and second ends of the blade with the first and second spiral axes substantially coinciding with the main central rotational axis, the first and second spirals of the at least one blade being of opposite hand when viewed axially in opposite directions from the respective first and second ends of the blade.

14. A rotor as claimed in claim 13 in which the first spiral of the at least one blade extends to a maximum spiral diameter, the maximum diameter of the second spiral being similar to the maximum diameter of the first spiral, and the first and second spirals of the at least one blade meet along the blade substantially midway between the first and second ends thereof.

15. A rotor as claimed in claim 13 in which the first spiral of the at least one blade extends around the main central rotational axis an angular distance of up to 120°, and the second spiral of the at least one blade extends around the main central rotational axis an angular distance of up to 120°.

16. A rotor as claimed in claim 13 in which the at least one blade is of substantially constant transverse cross-section along substantially its entire length.

17. A rotor as claimed in claim 13 in which the rotor comprises at least two elongated ribbon type blades, the first end of each blade being located adjacent the first location adjacent the main central rotational axis, and the second end of each blade being located adjacent the second location adjacent the main central rotational axis.

18. A rotor as claimed in claim 13 in which the rotor comprises an elongated main shaft and the first spiral of each blade extends from the first location adjacent the main shaft, and the second spiral of each blade extends from the second location adjacent the main shaft.

19. A rotor as claimed in claim 13 in which each blade is pivotally coupled adjacent the first and second locations relative to the main central rotational axis about a corresponding secondary axis for facilitating selective altering of the dive angle of the blade, the secondary axis of each blade extending substantially parallel to the main central rotational axis.

20. A rotor as claimed in claim 13 in which the rotor is adapted for use in a water powered turbine.

\* \* \* \* \*